United States Patent
Rosemann et al.

(10) Patent No.: US 8,757,951 B2
(45) Date of Patent: Jun. 24, 2014

(54) CLIP

(71) Applicant: Newfrey LLC, Newark (DE)

(72) Inventors: Frank Rosemann, Giessen (DE); Markus Jung, Giessen (DE); Karl Heinz Mielke, Giessen (DE)

(73) Assignee: Newfrey LLC, Newark, DE (US)

( * ) Notice: Subject to any disclaimer, the term of this patent is extended or adjusted under 35 U.S.C. 154(b) by 42 days.

(21) Appl. No.: 13/723,392

(22) Filed: Dec. 21, 2012

(65) Prior Publication Data

US 2013/0164099 A1 Jun. 27, 2013

(30) Foreign Application Priority Data

Dec. 23, 2011 (DE) .......................... 10 2011 056 968

(51) Int. Cl.
*F16B 19/00* (2006.01)

(52) U.S. Cl.
USPC ........................................ 411/508; 411/510

(58) Field of Classification Search
USPC ............ 411/508, 509, 510, 511; 24/289, 488, 24/520
See application file for complete search history.

(56) References Cited

U.S. PATENT DOCUMENTS

| | | | |
|---|---|---|---|
| 3,611,861 A | | 10/1971 | Schulze |
| 3,892,208 A | | 7/1975 | Yuda |
| 4,762,437 A | * | 8/1988 | Mitomi .......................... 403/11 |
| 4,781,488 A | * | 11/1988 | Hayashi .................... 403/408.1 |
| 5,191,513 A | | 3/1993 | Sugiura et al. |
| 5,288,189 A | * | 2/1994 | Hepworth ....................... 411/32 |
| 5,306,098 A | * | 4/1994 | Lewis .......................... 411/510 |
| 5,829,910 A | * | 11/1998 | Kameyama ................... 403/329 |
| 6,575,681 B2 | * | 6/2003 | Kojima et al. ................ 411/508 |
| 7,178,206 B2 | * | 2/2007 | Kuhnle et al. .................. 24/297 |
| 7,549,829 B2 | * | 6/2009 | Okada et al. ................. 411/508 |
| 2004/0208728 A1 | * | 10/2004 | Fattori et al. ................. 411/508 |
| 2005/0260060 A1 | * | 11/2005 | Zoubek et al. ............... 411/508 |

FOREIGN PATENT DOCUMENTS

DE 19532360 A 3/1997
GB 2125100 A 2/1984

OTHER PUBLICATIONS

EP Search Report Dated Mar. 15, 2013.

* cited by examiner

*Primary Examiner* — Robert A Delisle
(74) *Attorney, Agent, or Firm* — Michael P. Leary

(57) ABSTRACT

A clip for connecting at least two components that are provided with fastening through openings, the clip having a base body that includes a dished flange at one end and a fastening section at the opposite end, on the fastening section are located first elastic retaining fingers, which extend axially toward the flange, and second elastic retaining fingers, which extend axially away from the flange.

20 Claims, 3 Drawing Sheets

CLIP

CROSS-REFERENCE TO RELATED APPLICATIONS

This application claims priority from German Patent Application No. DE 10 2011 056 968.5, filed on Dec. 23, 2011, the disclosure of which is incorporated herein by reference.

BACKGROUND OF THE INVENTION

The invention concerns a clip for connecting at least two components provided with fastening openings. The clip having a base body that extends along an axis and has a dished flange at one end and a fastening section at the opposite end, having at least two first elastic retaining fingers that are located on the fastening section, extend in the direction of the flange, and at their free ends have support surfaces facing the flange, and having at least two second elastic retaining fingers that have retaining surfaces facing the flange.

In a clip of the specified type known from DE 4,141,308 C2 (corresponding to U.S. Pat. No. 5,191,513), the flange is connected by a first, plate-like connecting element to a retaining base in the shape of a circular disk, with a first pair of elastic retaining fingers attached on the side of the connecting element facing the flange. Located in the center of the side of the retaining base facing away from the flange is a second plate-like connecting element at the free end of which is attached a second pair of elastic retaining fingers which, like the first elastic retaining fingers, extend in the direction of the flange. It can be considered a disadvantage of the prior art clip that, when two components are connected by means of the clip, the second retaining fingers are located over nearly their full length on the back (as viewed in the direction of insertion) of the component they hold, and thus require an adequately large free space there. Since the axial length of the second retaining fingers cannot be reduced without adversely affecting their function, the prior art clip is not suitable for applications in which the required free space is lacking on the back of the component retained by the second fingers. Furthermore, components connected by the prior art clip cannot be separated if the clip is not accessible.

BRIEF SUMMARY

The object of the invention is to create a one-piece clip of the aforementioned type that can be made of thermoplastic material by injection molding, and that requires a relatively small amount of space on the sides facing away from one another of the components connected by the clip. In addition, the clip should be easy to install and should be inexpensive to produce from plastic as a single piece.

The object is attained according to the invention by the features specified in claim 1. Advantageous embodiments of the fastener are specified in claims 2 through 15.

According to the invention, the clip for connecting at least two components provided with fastening openings comprises a base body, which extends along an axis and has a dished flange at one end and a fastening section at the opposite end, wherein at least two first elastic retaining fingers are located on the fastening section, extend in the direction of the flange, and at their free ends have support surfaces facing the flange, and at least two second elastic retaining fingers are located on the fastening section, extend in a direction leading away from the flange, and on the outsides of their radially movable end sections have projections with retaining surfaces facing the flange.

In the clip according to the invention, the second elastic retaining fingers are mounted on the same fastening section as the first retaining fingers, and they extend in the direction in which the clip is inserted into the openings of the components being connected. This design has the advantage that only the fastening ends of the second elastic retaining fingers reach through the opening in the component they are to hold, so relatively little free space is required on the back of the component for the retaining fingers and their fastening. The spring arms of the second retaining fingers are located in the opening and to a greater or lesser extent on the front of the component, and can contribute to bridging the distance between the components connected by the clip.

The clip according to the invention has the additional advantage that the retention and spring forces of the first and second retaining fingers are absorbed at a point in the clip, namely the fastening section, that is located approximately in the center of the clip. The compact design of the base body thus achieved benefits the stability of the clip and allows for a simple design of the molds, especially for clip designs with more than two first and second retaining fingers.

According to another proposal of the invention, the clip can have at least two guide ribs that extend, next to the second retaining fingers, from the fastening section in the direction leading away from the flange, and on their outsides have guide surfaces parallel to the axis and at their free ends have centering surfaces extending at an angle to the axis. The guide ribs facilitate finding and insertion of the clip into the component opening, and center the clip in the opening during installation. After installation of the clip, the guide ribs serve to transmit forces to the component that arise transverse to the axis of the clip, thus avoiding excessively high stress on the second retaining fingers.

According to another proposal of the invention, the base body can have recesses on the inside of the first retaining fingers, which the first retaining fingers can enter during a radially inward-directed motion. As a result of the recesses, the first retaining fingers can be a relatively small distance from the base body without restricting their mobility, so that the outside surface of the base body can assist in transmitting transverse forces to the component being held. In advantageous fashion, the recesses can each be composed of a core opening that is parallel to the axis and that extends through the flange and encloses the axial projection of the axial finger associated with it. This simplifies the design of the molds.

According to another proposal of the invention, the retaining surfaces of the second retaining fingers can have a tilt toward the axis such that a pull-off force directed toward the flange can pull them out of the opening of a component held by the second retaining fingers. In this way, a connection of two components by the clip can be separated again by the application of a sufficiently high pull-off force, wherein the clip remains connected to one component. The clip is thus suitable for applications in which disassembly and reassembly is desired and is possible even if the clip is not accessible in the assembled state.

BRIEF DESCRIPTION OF THE SEVERAL VIEWS OF THE DRAWINGS

The invention is explained in detail below with reference to exemplary embodiments that are shown in the drawings. They show.

DETAILED DESCRIPTION OF THE PREFERRED EMBODIMENTS

Figure 1:
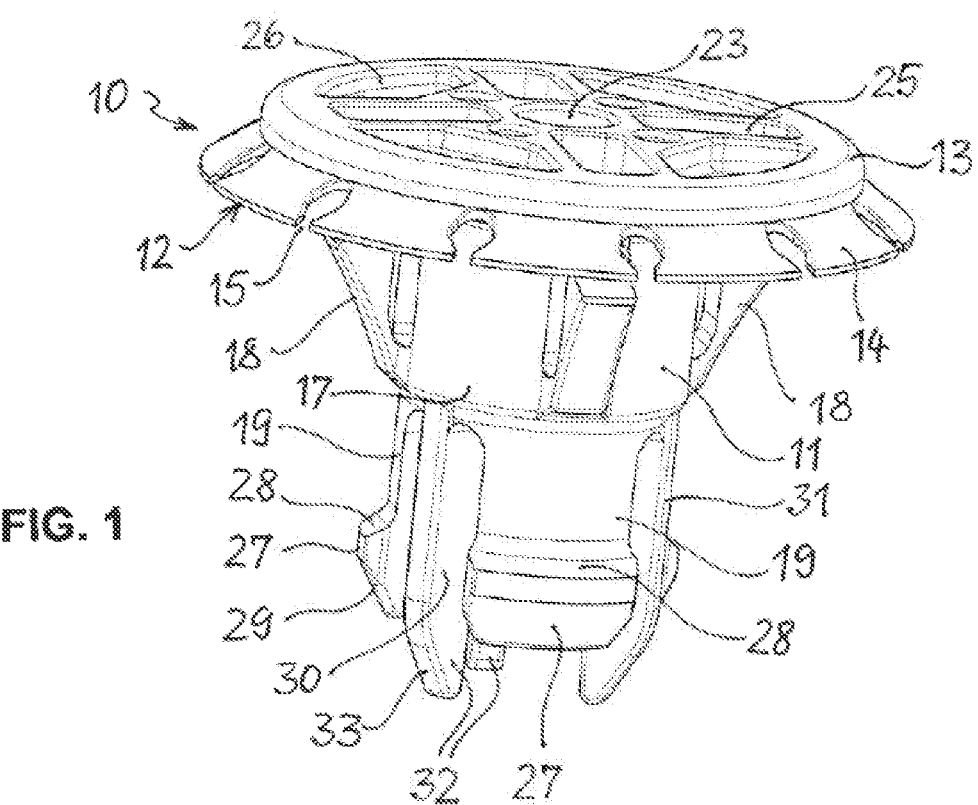
FIG. 1 a first perspective view of a first embodiment of a clip according to the invention, FIG. 2 a second perspective view of the clip from FIG. 1, FIG. 3 a cross-section through the clip from FIG. 1 in the installed state, FIG. 4 a first perspective view of a second embodiment of a clip according to the invention, FIG. 5 a second perspective view of the clip from FIG. 4, FIG. 6 a cross-section through the clip from FIG. 4 in the installed state.
Figure 2:
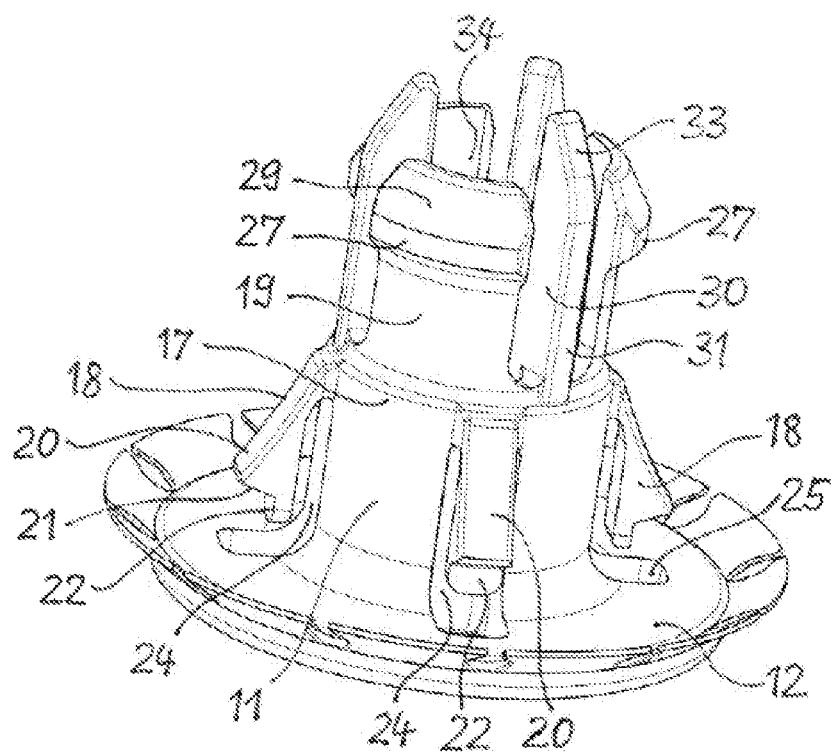

FIGS. 1 and 2 show a clip 10, which is produced in a single piece of thermo-plastic material by injection molding. The clip 10 is intended primarily for use in round openings, and has a base body 11 that is cylindrical in shape. Molded on one end of the base body 11 is a flange 12, which consists of a flange section 13 with a circular disk shape, and a spring ring 14 surrounding the flange section. The flange section 13 has an outside diameter that is approximately twice the size of the outside diameter of the base body 11. The spring ring 14 is in the shape of a truncated cone, and projects from the flange section 13 in the axial direction on the side facing the base body 11. In addition, to increase flexibility the outside edge of the spring ring 14 is subdivided into individual sections by slots 15. As a result, the spring ring forms an elastic support, which holds the connection between the clip 10 and a component resting against the flange 12 such that the connection is free of play, and can compensate for variations in the component's thickness.

The end of the base body 11 opposite the flange forms a fastening section 17, to which are attached four first retaining fingers 18 and three second retaining fingers 19. The first retaining fingers 18 are connected to the circumferential edge of the fastening section 17 and extend in the direction of the flange 12, with their backs that face the center axis being parallel thereto. The retaining fingers 18 have a wedge-shaped cross-section in the radial direction, which increases with increasing distance from the end at which they are attached. The outsides of the retaining fingers 18 opposite the backs thus form ramp surfaces 20 that are tilted toward the center axis and whose distance from the center axis increases with increasing distance from the fastening section 17. At their free ends, the retaining fingers 18 are provided with an acute-angled notch, as a result of which are formed support surfaces 21 extending essentially radially, and centering surfaces 22 parallel to the axis. So that the retaining fingers 18 can deflect radially inward, the base body 11 has recesses 24 behind the retaining fingers 18. The recesses 24 are formed by core openings 25 that extend through the flange 12 parallel to the center axis and project radially outwardly into the flange 12 far enough that their cross-section openings enclose the axial projections of the retaining fingers 18 associated with the core openings 25. A core of the mold engaging in a core opening 25 can thus shape the back and the acute-angled notch at the end of the retaining finger 18 in addition to the recess 24. In the top of the flange section 13, approximately triangular hollows 26 are formed next to the core openings in order to reduce the material thickness there. In addition, the flange 12 and the base body 13 are provided with a central through-hole 23 for the same reason.

The second retaining fingers 19 are attached to the underside of the fastening section 17 facing away from the flange 12 and extend from the fastening section 17 parallel to the center axis in the direction away from the flange 12. The second retaining fingers 19 each have a wall curved concentrically to the center axis that extends in the circum-ferential direction over an angle of approximately 60°. The retaining fingers 19 are each provided at their free ends, on the outside, with a rib 27 extending in the circumferential direction, which has a cross-section that narrows radially outward, and which forms a retaining surface 28 with the side facing the fastening section 17 and forms a ramp surface 29 with the opposite side. The retaining surfaces 28 are sections of an imaginary first conical surface coaxial to the center axis, the cone angle of which is approximately 90° but can also be larger or smaller. The ramp surfaces 29 are sections of an imaginary second conical surface coaxial to the center axis, the cone angle of which is approximately 30°.

Located between the uniformly spaced second retaining fingers 19 are guide ribs 30 that are attached at one end to the fastening section 17. The outsides of the guide ribs 30 form guide surfaces 31 that are parallel to the center axis. At the free ends 32 that project beyond the retaining fingers 19, the guide ribs 30 are provided on the outside with centering surfaces 33 extending at an angle to the guide surfaces 31. Located in the center of the retaining fingers 19 and the guide ribs 30 is a free space 34 into which the retaining fingers 19 can be moved during installation of the clip.

Figure 3:
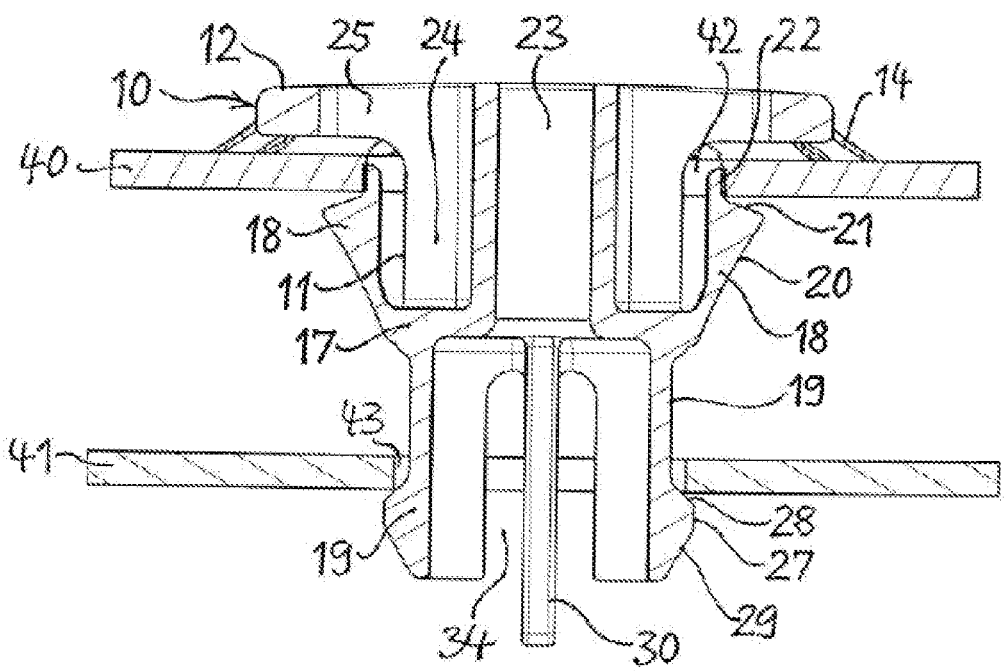

FIG. 3 shows the clip 10 in the installed position, in which it connects a trim part 40, for example an underbody of a vehicle, to a support part 41, for example a part of the vehicle body. The fastening of the trim part 40 to the support part 41 typically takes place in two steps separate from one another. In a first step, the clip 10 is placed in an opening 42 in the trim part 40 provided for this purpose. The diameter of the opening 42 corresponds to the spacing of the centering surfaces 22 of opposing retaining fingers 18 of the clip 10. For installation, the clip 10 is inserted in the opening 42 with the guide ribs 30 forward, and is then brought into the installed position in the trim part 40 as shown by a compressive force acting on the flange 12. During this process, the edge of the opening 42 slides along the ramp surfaces 20, causing the first retaining fingers 18 to be elastically pressed into the recesses 24. Once the edge of the opening 42 leaves the ramp surfaces 20 at the free end of the retaining fingers 18, the retaining fingers 18 spring back into their original position, and contact the inside surface of the opening 42 with their centering surfaces 22 and the edge of the opening 42 with their support surfaces 21. In this way, the clip 10 is held securely in the opening 42 of the trim part 40 and is centered relative to the opening 42. When the clip 10 is moved into the locking position, the spring ring 14 of the flange 12 resting against the trim part 40 is also elastically deformed in the axial direction and thereby axially loaded, so that it produces an axial spring force by which the first retaining fingers 18 are pressed against the trim part 40 and the clip 10 is clamped in place on the trim part 40. The clip 10 is thus retained securely on the trim part 40 in a position centered relative to the opening 42 in preparation for the second assembly step.

In the second assembly step, in order to connect the trim part 40 with the support part 41, the trim part 40 provided with the clip 10 is placed on the support part 41 such that the clip 10 can engage in an opening 43 provided for this purpose in the support part 41. In this process, the guide ribs 30 projecting on the insertion side of the clip 10 facilitate finding the opening 43, which may be hidden by the trim part 40, and facilitate introduction of the clip 10 into the opening 43.

After the guide ribs 30 have entered the opening 43, the ramp surfaces 29 of the second retaining fingers 19 come into contact with the edge of the opening 43. Due to subsequent pressing of the trim part 40 against the support part 41, the clip enters further into the opening 43, in which process the edge of the opening presses the retaining fingers 19 radially inward via the ramp surfaces 29 of the ribs 27 and slides past the ribs 27 onto the retaining surfaces 28. Once the edge of the opening reaches the retaining surfaces 28, the retaining fingers 19 spring back into their original position, assisting the entering motion of the clip 10. In the position of the clip 10 relative to the support part 41 shown in FIG. 3, the retaining fingers 19 securely hold the clip 10 in the opening 43 with their retaining surfaces 28.

The retention force of the connection between the clip 10 and the support part 41 that has been achieved in this way depends on the stiffness of the retaining fingers 19 and the cone angle of the retaining surfaces 28, and can be matched to the require-ments prevailing in the particular case by the design of the cone angle and of the stiffness of the retaining fingers 19. If the cone angle of the retaining surfaces 28 is not too large, then the connection between the clip 10 and the support part 41 can be separated with the aid of a sufficiently large pull-off force. The clip is then suited to applications in which the possibility of repeated disassembly and assembly is required.

Figure 4:
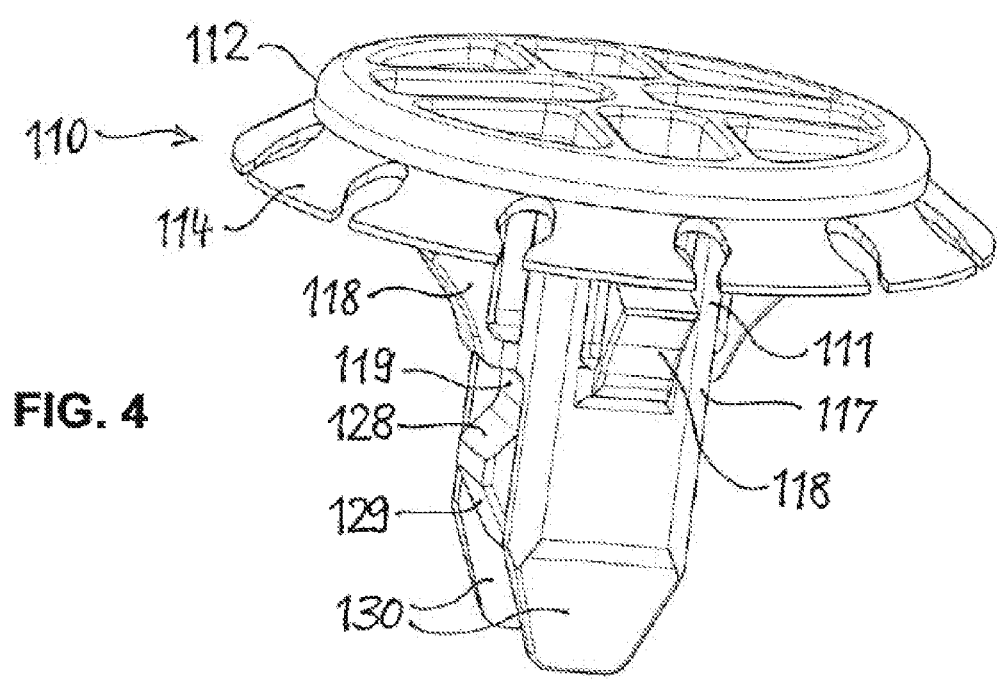
Figure 5:
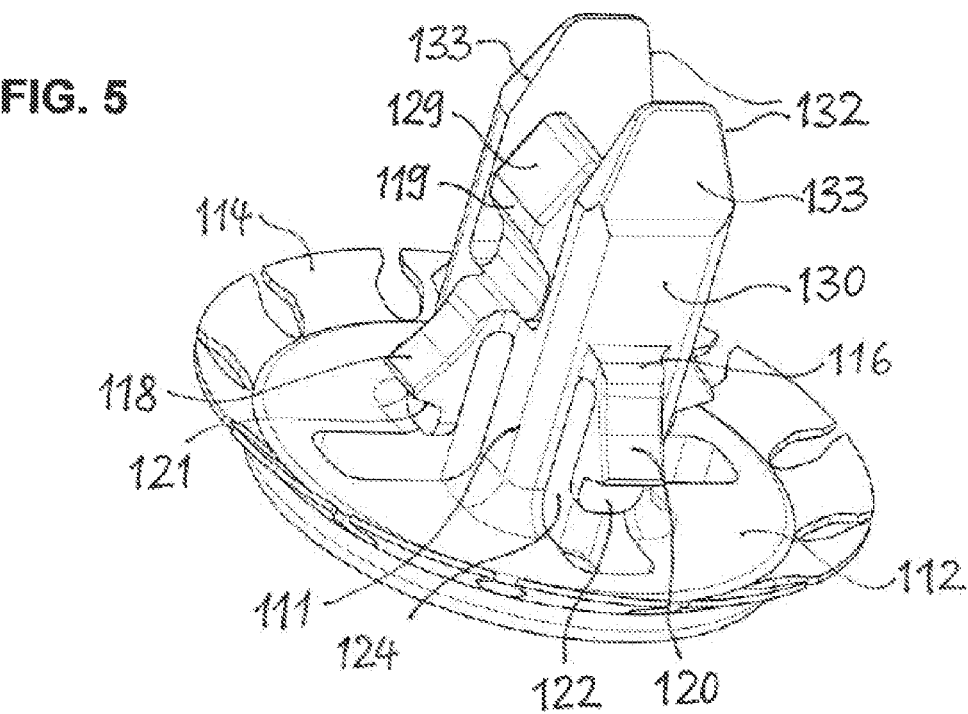
Figure 6:
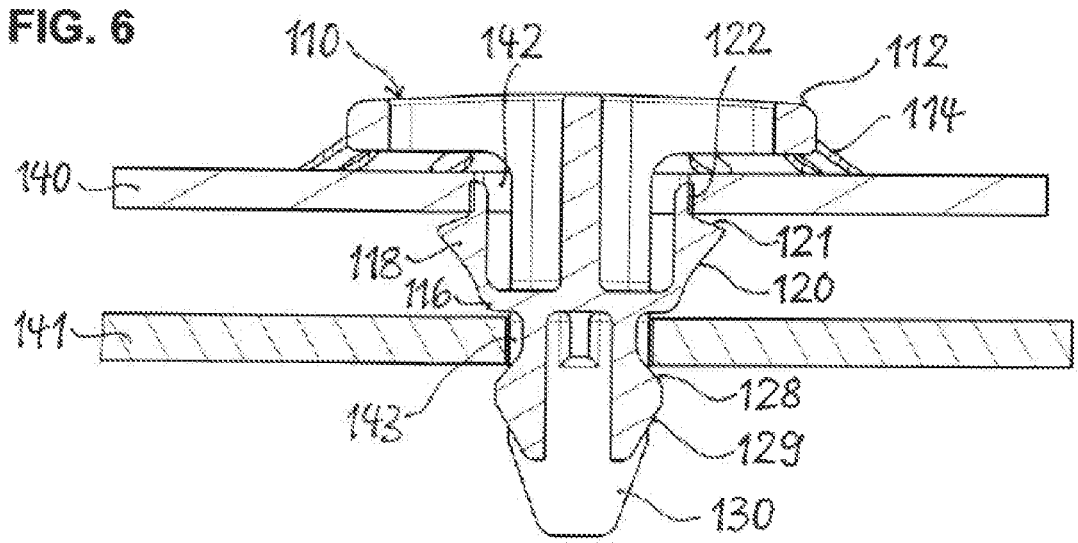

FIGS. 4 to 6 show an embodiment of a clip 110 that is intended to be placed in square or rectangular openings and that is equivalent to the clip 10 in its fundamental design and function. The clip 110 has a cuboid base body 111 and a flange 112 in the form of a circular disk with a spring ring 114. The base body 111 forms a fastening section 117 at a distance from the flange 112 to which are attached four elastic first retaining fingers 118 extending in the direction of the flange 112 and two elastic second retaining fingers 119 extending in the opposite direction. The retaining fingers 118 have ramp surfaces 120 on the outside and have, at the free ends, support surfaces 121 and centering surfaces 122. They serve to fasten the clip 110 in an opening 142 of a trim part 140. The base body 111 is provided with recesses 124 for the elastic motion of the retaining fingers 118.

The retaining fingers 119 are located opposite one another and have retaining surfaces 128 and ramp surfaces 129 on the outside. On both sides of the retaining fingers 119, plate-like guide ribs 130 are located on the base body 111. The free ends 132 of the guide ribs 130 project past the retaining fingers 119 and are beveled on the outside to form centering surfaces 133.

As is shown in FIG. 6, the guide ribs 130 serve to align the clip 110 in an opening 143 of a support part 141 and support it on the support part 141 transverse to its center axis. The retaining fingers 119 secure the clip 110 in the opening 143 of the support part 141 with their guide surfaces 131.

In the clip 110, the spring arms of the retaining fingers 119 are dimensioned very short so that in the installation position shown the support part 141 can also be supported on the fastening ends 116 of the retaining fingers 118. The clip 110 is thus also suited to hold the trim part 140 and the support part 141 at a specific spacing.

The clip according to the invention is inexpensive to produce and simple to install on account of its one-piece design. During installation, the clip centers itself in the opening of the trim part resting on the flange by means of the first retaining fingers, which significantly simplifies finding the hole in the support part. Because of the flexible spring ring, the clip is held without play and different thicknesses of the trim part can be compensated for. The elastic retaining fingers and the spring ring act to damp vibrations and reduce the transmission of noise between the parts connected by the clip. The shape of the clip permits molds that can be produced easily and inexpensively, and also allows mold designs without slides. As a result, the clip can be manufactured very inexpensively. Lateral forces are absorbed by the guide bars of the clip, and unwanted detachment of the clip from the opening is made more difficult. Positional tolerances of the fastening openings can be compensated for by displacement of the clip relative to the support part.

Although exemplary embodiments of the present invention have been shown and described, it will be appreciated by those skilled in the art that changes may be made to these embodiments without departing from the principles and spirit of the invention, the scope of which is defined in the appended claims and their equivalents.

The invention claimed is:

1. A clip for connecting a first component, defining a first through opening, and a second component, defining a second through opening, the clip comprising:
   a base body that extends along an axis and has a dished flange at a top end and a fastening section at an opposite bottom end;
   a first elastic retaining finger connected at a base end to the fastening section and axially extending to a tip end in a first direction toward the flange, and the tip end is radially movable and includes a support surface facing the flange, and
   a second elastic retaining finger connected at a fixed end to the fastening section and axially extending to a rib end in a second direction away from the flange, and the rib end is radially movable and includes a retaining surface facing the flange.

2. A clip according to claim 1, and further comprising a guide rib next to the second retaining finger, the guide rib connected at a joined end to the fastening section and axially extending to a free end in a second direction away from the flange, and the guide rib includes a radially outward facings guide surface parallel to the axis, and the free end includes a centering surface extending at an angle to the axis.

3. A clip according to claim 2, wherein the base body, the second retaining finger, and the guide rib partially define a radially inward and axially extending free space, and the rib end of the second retaining finger is radially compressible into the free space.

4. A clip according to claim 1, wherein the base body defines a recess radially inward of the first retaining finger, and the tip end of the first retaining finger is radially compressible into the recess.

5. A clip according to claim 4, wherein the recess is composed of a core opening extending axially topward through the flange and radially outward into the flange, and the cross section of the core opening encloses the axial projection of the first retaining finger.

6. A clip according to claim 1, wherein the retaining surface of the second retaining fingers are inclined at an angle to the axis such that a pull-off force directed toward the flange can pull them out of the opening of a component held by the second retaining finger.

7. A clip according to claim 1, wherein the second retaining finger further includes a wall section defining a radial angle of approximately 60° in a plane transverse to the axis.

8. A clip according to claim 1, wherein the second retaining finger has at the rib end an exterior rib extending transverse to the axial direction, and the rib includes a radially outward projecting mid-portion, the retaining surface sloping radially inward and axially upward from a first axial side of the mid-portion toward the fastening section, and a ramp surface sloping radially inward and axially downward from a second axial side of the mid-portion toward the rib end.

9. A clip according to claim 1, wherein the base end of the first retaining fingers and the retaining surface on the second retaining finger partially define axially in between a support area operable to hold the second component.

10. A clip according to claim 1, wherein the first retaining finger is a plurality of first retaining fingers uniformly spaced around a perimeter of the fastening section.

11. A clip according to claim 1, wherein the second retaining finger is a plurality of second retaining fingers uniformly spaced around a perimeter of the fastening section.

12. A clip according to claim 1, wherein the tip end of the first retaining finger further includes a centering surface extending substantially axially parallel to the axis, and the support surface extends substantially radially outward from the centering surfaces, and the supporting surface and centering surface partially define a notch operable to engage the first component and the first through opening.

13. A clip according to claim 1, wherein the flange has an elastic edge region that projects slanting from the flange radially outward and axially in the direction of the fastening section.

14. A clip according to claim 13, wherein the elastic edge region of the flange is a spring ring defining a plurality of radial slits.

15. A clip according to claim 1, wherein the clip is primary molded as a single piece from a thermoplastic material by an injection molding process.

16. A clip according to claim 1, and further comprising a guide rib connected at a joined end to the fastening section and axially extending in a second direction away from the flange to a free end; and the guide rib includes a radially outward facings guide surface parallel to the axis, and the free end includes a centering surface extending at an angle to the axis, and the free end of the guide rib axially extends further than the rib end of the second retaining finger.

17. A clip according to claim 16, wherein the base body, the second retaining finger, and the guide rib partially define a radially inward and axially extending free space open in the axial direction away from the flange, and the rib end of the second retaining finger is radially compressible into the free spaces.

18. A clip according to claim 1, wherein the tip end of the first retaining finger includes a support surface facing the flange, and a centering surface extending axially away from the flange, and the support surface extends radially outward from and substantially perpendicular to the centering surfaces, and the supporting surface and centering surface partially define a notch operable to engage the first workpiece at the first through opening.

19. A clip for connecting a first workpiece, defining a first through opening, and a second workpiece, defining a second through opening, the clip comprising:
- a base body having a top end and an opposite bottom end and defining a longitudinal axis, the base body including a flange at the top end and a fastening section at the bottom end;
- a first elastic retaining finger connected at a base end to the fastening section and axially extending in a first direction toward the flange to a radially movable tip end;
- a second elastic retaining finger connected at a base end to the fastening section and axially extending in a second direction away from the flange to a radially movable rib end; and
- wherein axially in-between the flange and the tip end of the first retaining finger there is partially defined a first space for holding the first workpiece, and axially in-between the fastening section and the rib end of the second retaining finger there is partially defined a second space for holding the second workpiece.

20. A clip according to claim 19, wherein the second retaining finger has at the rib end an exterior rib extending transverse to the axial direction, and the rib includes a radially outward projecting mid-portion, a retaining surface sloping radially inward and axially upward from a first axial side of the mid-portion toward the fastening section, and a ramp surface sloping radially inward and axially downward from a second axial side of the mid-portion toward the rib end.

* * * * *